(12) United States Patent
Okubo

(10) Patent No.: US 8,825,333 B2
(45) Date of Patent: Sep. 2, 2014

(54) DEVICE FOR CONTROLLING VEHICLE WHEEL SLIP USING VARIABLE SLIP RATIO THRESHOLDS

(75) Inventor: Ryosuke Okubo, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 9 days.

(21) Appl. No.: 13/581,676

(22) PCT Filed: Mar. 2, 2010

(86) PCT No.: PCT/JP2010/053360
§ 371 (c)(1),
(2), (4) Date: Aug. 29, 2012

(87) PCT Pub. No.: WO2011/108082
PCT Pub. Date: Sep. 9, 2011

(65) Prior Publication Data
US 2012/0323459 A1  Dec. 20, 2012

(51) Int. Cl.
*B60T 8/172*  (2006.01)
*B60T 8/1761* (2006.01)
*B60T 8/175*  (2006.01)

(52) U.S. Cl.
CPC ............. *B60T 8/17616* (2013.01); *B60T 8/172* (2013.01); *B60T 2250/04* (2013.01); *B60T 8/175* (2013.01)
USPC ................... 701/74; 701/75; 701/82; 701/83; 303/163

(58) Field of Classification Search
CPC ..... B60T 8/172; B60T 8/175; B60T 8/17616; B60T 2250/04

USPC ........................ 701/74, 75, 82, 83; 303/163
See application file for complete search history.

(56) References Cited

U.S. PATENT DOCUMENTS

| 4,873,638 A | 10/1989 | Shiraishi et al. |
| 4,976,329 A * | 12/1990 | Ise .................................... 701/83 |

(Continued)

FOREIGN PATENT DOCUMENTS

| JP | 62 265432 | 11/1987 |
| JP | 6 247278  | 9/1994  |

(Continued)

OTHER PUBLICATIONS

Chunting Mi; Hui Lin; Yi Zhang, "Iterative learning control of antilock braking of electric and hybrid vehicles," Vehicular Technology, IEEE Transactions on , vol. 54, No. 2, pp. 486-494, Mar. 2005.*

(Continued)

*Primary Examiner* — Helal A Algahaim
*Assistant Examiner* — Donald J Wallace
(74) *Attorney, Agent, or Firm* — Oblon, Spivak, McClelland, Maier & Neustadt, L.L.P.

(57) ABSTRACT

Control to inhibit a slip of a wheel by controlling braking/driving force generated at the wheel is performed when a slip ratio of the wheel of a vehicle according to a running state of the vehicle becomes larger than a slip ratio threshold value set in advance or when a ratio between wheel acceleration of the wheel and a vehicle speed of the vehicle according to the running state of the vehicle becomes larger than a ratio threshold value. Therefore, it is possible to improve control accuracy when controlling a slip state of the wheel by decreasing an effect of operation by a driver and a road surface and the like, for example.

4 Claims, 7 Drawing Sheets

(56) References Cited

U.S. PATENT DOCUMENTS

| | | | | |
|---|---|---|---|---|
| 5,046,787 | A | * | 9/1991 | Kuwana et al. ............... 701/75 |
| 5,065,327 | A | * | 11/1991 | Yahagi et al. ............... 701/74 |
| 5,365,444 | A | * | 11/1994 | Suzuki et al. ............... 701/74 |
| 5,370,199 | A | * | 12/1994 | Akuta et al. ............... 701/74 |
| 6,089,682 | A | * | 7/2000 | Ishikawa et al. ............ 303/163 |
| 6,122,586 | A | * | 9/2000 | Shimizu ............... 701/74 |
| 6,203,121 | B1 | | 3/2001 | Kato et al. |
| 6,904,349 | B2 | * | 6/2005 | Mori ............... 701/74 |
| 2007/0164606 | A1 | * | 7/2007 | Goebels et al. ............ 303/140 |

FOREIGN PATENT DOCUMENTS

| | | |
|---|---|---|
| JP | 6 286590 | 10/1994 |
| JP | 11 48939 | 2/1999 |
| JP | 2000 190836 | 7/2000 |

OTHER PUBLICATIONS

International Search Report Issued Apr. 13, 2010 in PCT/JP10/53360 Filed Mar. 2, 2010.

* cited by examiner

DEVICE FOR CONTROLLING VEHICLE WHEEL SLIP USING VARIABLE SLIP RATIO THRESHOLDS

FIELD

The present invention relates to a vehicle control device.

BACKGROUND

The patent literature 1 discloses an antiskid control device, which performs so-called ABS control based on road surface μ calculated according to acceleration and a slip ratio of a wheel, for example, as a conventional vehicle control device. According to this, the antiskid control device estimates a vehicle speed with high accuracy even during antiskid control in which a braking slip occurs at all the wheels, thereby improving antiskid control performance.

CITATION LIST

Patent Literature

Patent Literature 1: Japanese Patent Application Laid-open No. H11-048939

SUMMARY

Technical Problem

There is room for improvement in the control accuracy at the time of control of a slip state of the wheel such as the ABS control, for example, in the antiskid control device disclosed in the above-described patent literature 1.

The present invention is achieved in view of the above-described circumstances and an object thereof is to provide the vehicle control device capable of improving the control accuracy when controlling the slip state of the wheel.

Solution to Problem

In order to achieve the above mentioned object, in a vehicle control device according to the present invention, when a ratio between wheel acceleration of a wheel of a vehicle and a vehicle speed of the vehicle according to a running state of the vehicle becomes larger than a ratio threshold value, which changes according to vehicle speed, the vehicle control device performs control to inhibit a slip of the wheel by controlling braking/driving force generated at the wheel.

Further, in the vehicle control device, it is possible to configure that the ratio threshold value changes according to the vehicle speed.

Further, in the vehicle control device, it is possible to configure that when a slip ratio of the wheel according to the running state of the vehicle becomes larger than a slip ratio threshold value set in advance, the vehicle control device performs the control to inhibit the slip of the wheel by controlling the braking/driving force generated at the wheel.

Further, in the vehicle control device, it is possible to configure that the ratio is a parameter correlated with a slip ratio speed of the wheel.

As a reference example, in a vehicle control device according to the present invention, when a slip ratio of a wheel of a vehicle according to a running state of the vehicle becomes larger than a slip ratio threshold value set in advance or when a slip ratio speed of the wheel according to the running state of the vehicle becomes larger than a slip ratio speed threshold value set in advance, the vehicle control device may perform control to inhibit a slip of the wheel by controlling braking/driving force generated at the wheel.

As a reference example, in the vehicle control device, it may be possible to configure that the slip ratio speed is calculated based on a wheel speed of the wheel and a vehicle speed of the vehicle.

As a reference example, in the vehicle control device, it may be possible to configure that the slip ratio speed is approximately calculated based on wheel acceleration of the wheel and a vehicle speed of the vehicle.

Advantageous Effects of Invention

The vehicle control device according to the present invention has an effect of improving the control accuracy when controlling the slip state of the wheel.

DESCRIPTION OF EMBODIMENTS

Embodiments of a vehicle control device according to the present invention are hereinafter described in detail with reference to the drawings. Meanwhile, the present invention is not limited by the embodiments. Also, components in the following embodiments include a component, which may be easily replaced by one skilled in the art, or a substantially identical component.

First Embodiment

Figure 1:
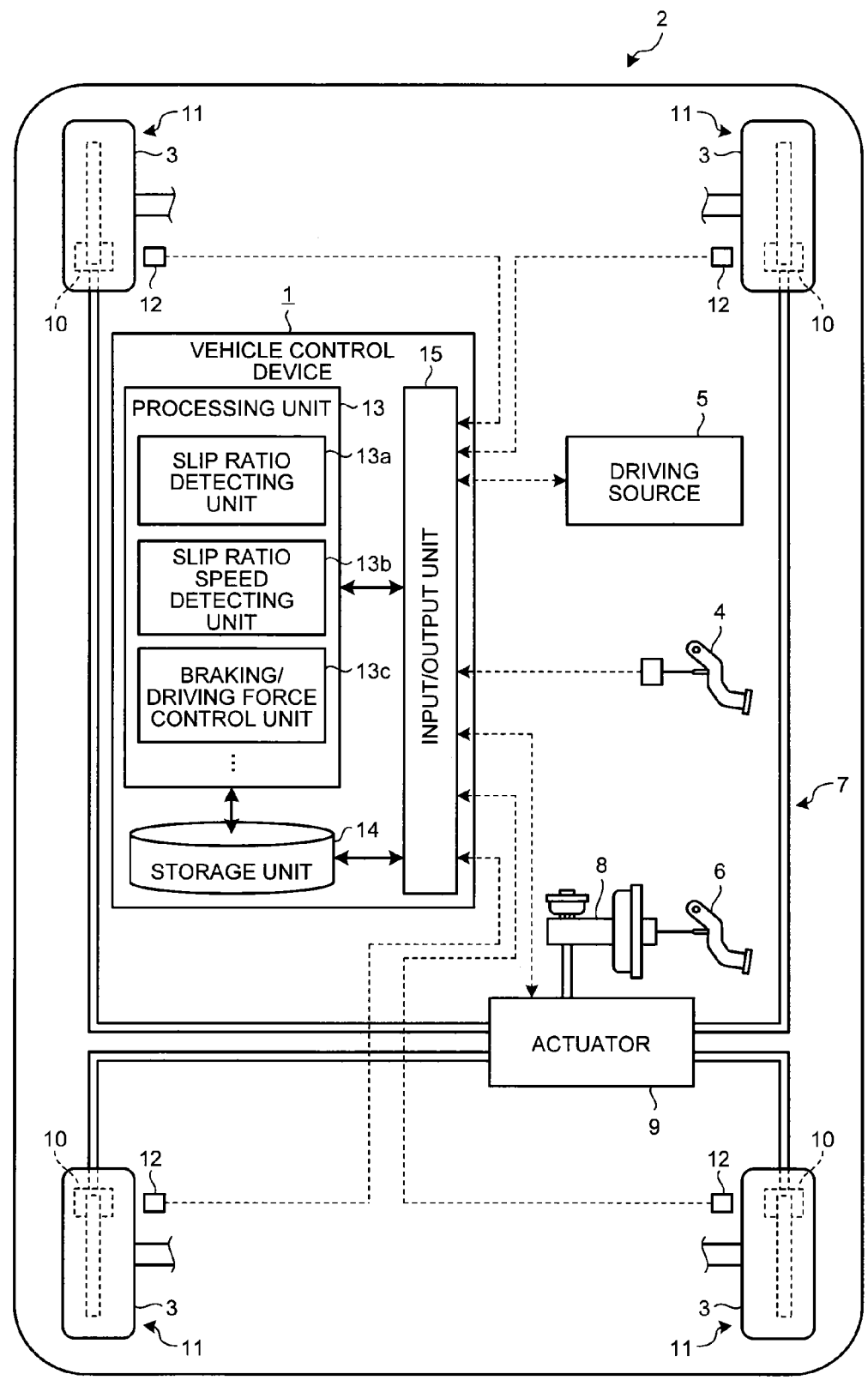
FIG. 1 is a schematic configuration diagram of a vehicle control device according to a first embodiment.
Figure 2:
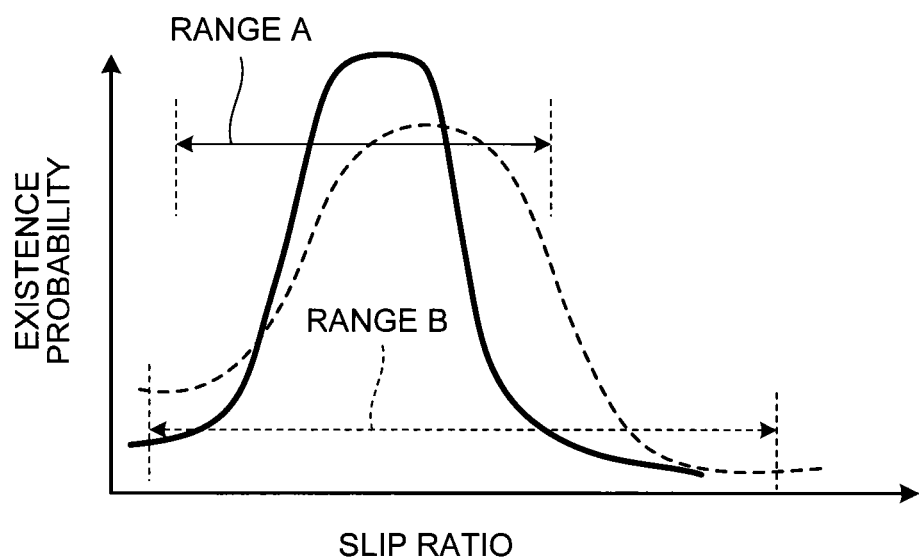
FIG. 2 is a diagram explaining existence probability of a slip ratio.
Figure 3:
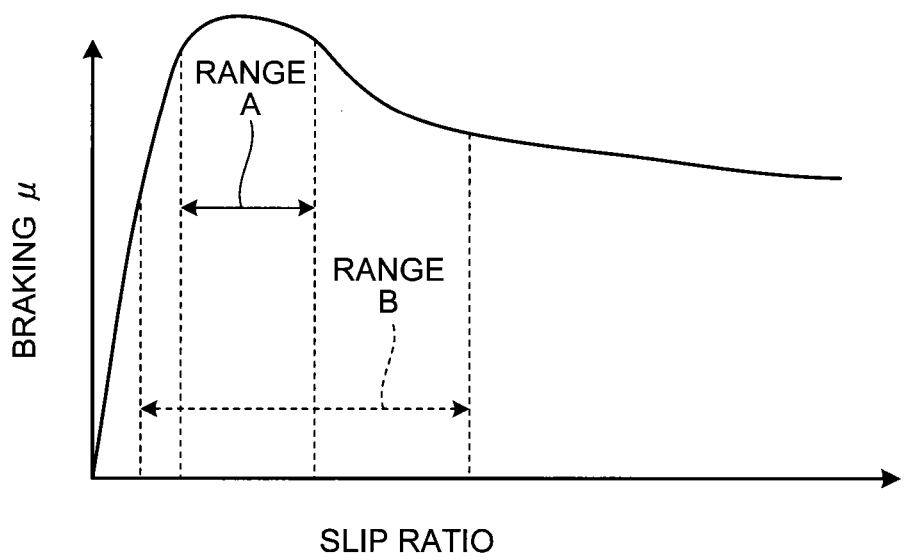
FIG. 3 is a diagram illustrating a braking friction coefficient with respect to the slip ratio.
Figure 4:
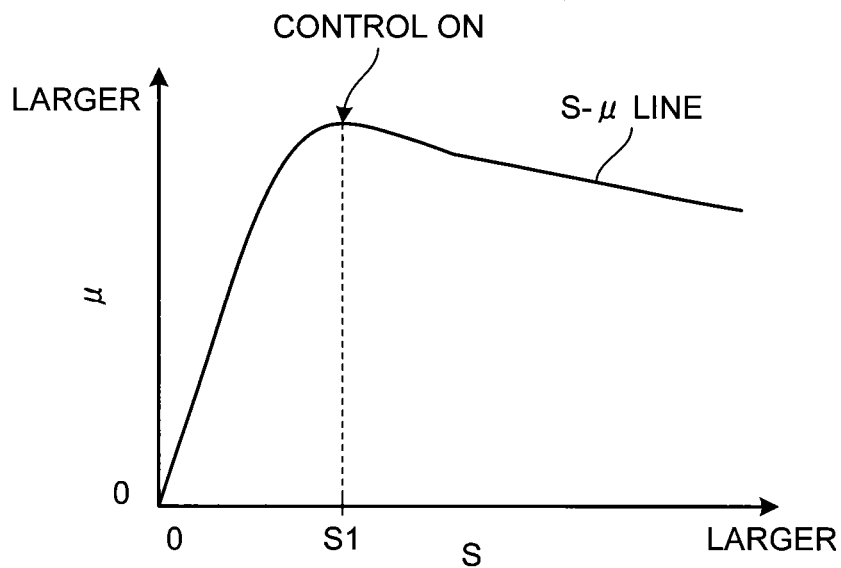
FIG. 4 is a diagram explaining slip ratio judgment of the vehicle control device according to the first embodiment.
Figure 5:
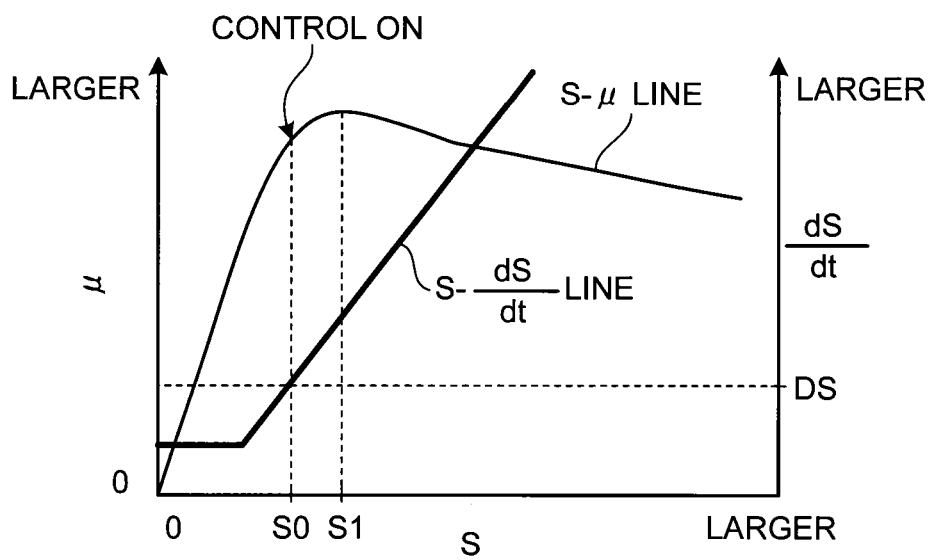
FIG. 5 is a diagram explaining slip ratio speed judgment of the vehicle control device according to the first embodiment.
Figure 6:
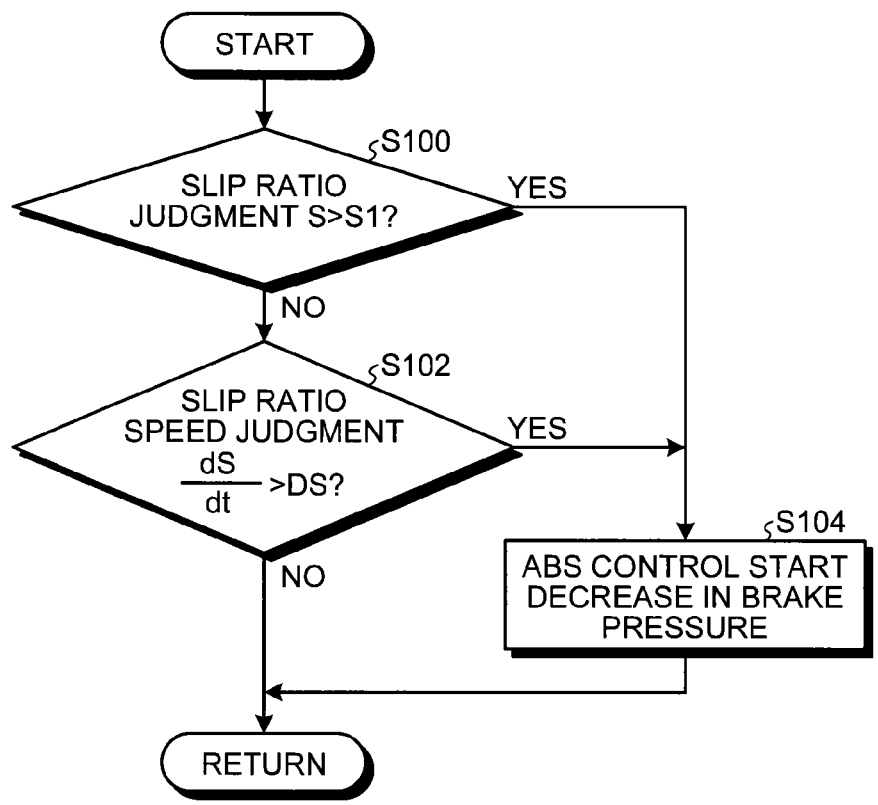
FIG. 6 is a flowchart explaining an example of control of the vehicle control device according to the first embodiment.
Figure 7:
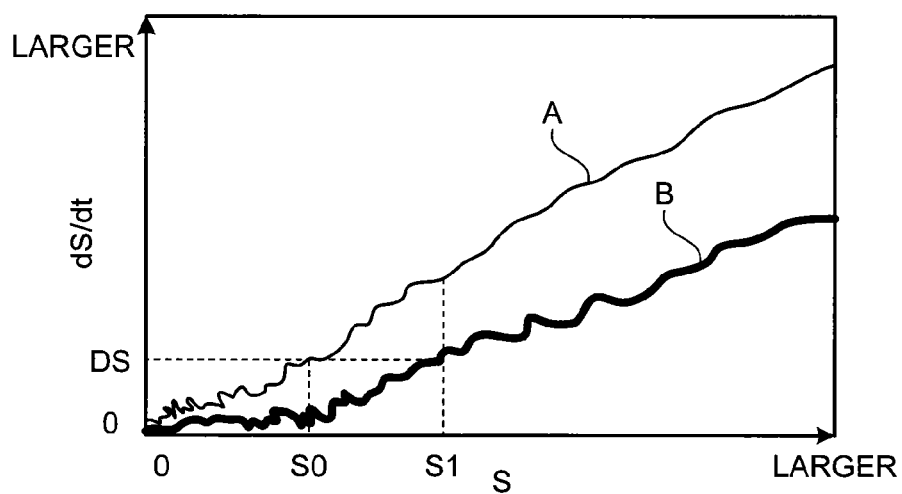
FIG. 7 is a diagram explaining an example of operation of the vehicle control device according to the first embodiment.

FIG. 1 is a schematic configuration diagram of a vehicle control device according to a first embodiment, FIG. 2 is a diagram explaining existence probability of a slip ratio, FIG. 3 is a diagram illustrating a braking friction coefficient with respect to the slip ratio, FIG. 4 is a diagram explaining slip ratio judgment of the vehicle control device according to the first embodiment, FIG. 5 is a diagram explaining slip ratio speed judgment of the vehicle control device according to the first embodiment, FIG. 6 is a flowchart explaining an example of control of the vehicle control device according to the first embodiment, and FIG. 7 is a diagram explaining an example of operation of the vehicle control device according to the first embodiment.

A vehicle control device 1 of this embodiment is mounted on a vehicle 2 for controlling a slip state of a wheel 3 by controlling braking/driving force generated at the wheel 3 of the vehicle 2. The vehicle 2 is provided with the vehicle control device 1, the wheel 3, an accelerator pedal 4, a driving source 5, a brake pedal 6, a braking device 7 and the like. In the vehicle 2, the driving source 5 generates power (torque) according to operation of the accelerator pedal 4 by a driver and the power is transmitted to the wheel 3 by means of a power transmission device (not illustrated) such as a transmission, a differential device, and a drive shaft to generate the driving force at the wheel 3. Also, the vehicle 2 generates the braking force at the wheel 3 by operation of the braking device 7 according to operation of the brake pedal 6 by the driver.

The driving source 5 is a power source for running such as an internal combustion engine and a motor. A variety of well-known hydraulic braking device of which hydraulic path from a master cylinder 8 through an actuator 9 to a wheel cylinders 10 is filled with brake oil being working fluid serve as the braking device 7. In the braking device 7, basically, a master cylinder pressure (operation pressure) is applied to the brake oil by the master cylinder 8 according to pedal force (operation force) acting on the brake pedal 6 by the operation of the brake pedal 6 by the driver. Then, in the braking device 7, the master cylinder pressure acts as a wheel cylinder pressure (brake pressure) on each wheel cylinder 10, and according to this, a hydraulic braking unit 11 including a caliper, a brake pad, a disk rotor and the like operates to generate pressure braking force at the wheel 3. During this, in the braking device 7, the wheel cylinder pressure is appropriately adjusted according to an operating state by the actuator 9.

More specifically, the actuator 9 is composed of a hydraulic control device (hydraulic control circuit) controlled by the vehicle control device 1, for example. The actuator 9 includes a plurality of pipes, an oil reservoir, an oil pump, each hydraulic pipe connected to each wheel cylinder 10 provided on each wheel 3, a plurality of electromagnetic valves for increasing, decreasing, and maintaining a hydraulic pressure of each hydraulic pipe and the like.

The actuator 9 is capable of adjusting the wheel cylinder pressure acting on the wheel cylinder 10 according to an operation amount (depression amount) of the brake pedal 6 by the driver by drive of the oil pump and a predetermined electromagnetic valve according to a control instruction of the vehicle control device 1, for example, at the time of normal operation. Also, the actuator 9 can operate in a pressure increasing mode in which the wheel cylinder pressure acting on the wheel cylinder 10 is increased, a maintaining mode in which this is maintained substantially constant, and a pressure decreasing mode in which this is decreased by the drive of the oil pump and a predetermined electromagnetic valve according to the control instruction of the vehicle control device 1, for example, at the time of vehicle control to be described later. The actuator 9 is capable of separately setting the above-described mode for each wheel cylinder 10 provided on each wheel 3 according to a running state of the vehicle 2 by the control by the vehicle control device 1. That is to say, the actuator 9 is capable of separately adjusting the braking force acting on each wheel 3 according to the running state of the vehicle 2 irrespective of the operation of the brake pedal 6 by the driver.

Herein, the vehicle control device 1 includes an electronic circuit mainly composed of a well-known microcomputer including a CPU, ROM, RAM, and an interface. To the vehicle control device 1, an electric signal corresponding to a detection result detected by various sensors attached to each part of the vehicle 2, for example, each wheel speed sensor 12, which detects a wheel speed of each wheel 3, and the like is input. The vehicle control device 1 controls the driving source 5 and the actuator 9 by executing a stored control program based on various input signals and various maps input from the various sensors.

The vehicle control device 1 of this embodiment is capable of realizing an ABS (antilock brake system) function, a TRC (traction control system) function and the like of the vehicle 2 by controlling the driving source 5 and the actuator 9 according to the running state of the vehicle 2. That is to say, when the wheel 3 slips in association with depression operation of the accelerator pedal 4 (acceleration operation) and depression operation of the brake pedal 6 (brake operation) by the driver, the vehicle control device 1 applies optimal braking/driving force according to the running state of the vehicle 2 to the wheel 3 by adjusting the braking/driving force of the wheel 3 in the slip state. The vehicle control device 1 controls the slip state of the wheel 3, for example, the slip ratio of the wheel 3, which is an index indicating a slip (skid) between a tire of the wheel 3 and a road surface, by controlling the braking/driving force generated at the wheel 3 by adjusting an output of the driving source 5 and the wheel cylinder pressure (hereinafter, referred to as "brake pressure" unless otherwise noted) as the brake pressure of the braking device 7. The vehicle control device 1 controls the braking/driving force generated at the wheel 3 such that an actual slip ratio becomes a target slip ratio. Herein, the target slip ratio is the slip ratio in the vicinity of a peak µ slip ratio at which a friction coefficient of the tire of the wheel 3 is the maximum, for example. The vehicle control device 1 executes control of the slip ratio (slip ratio control) according to the running state of the vehicle 2 in order to realize the ABS function and the TRC function of the vehicle 2.

For example, the vehicle control device 1 executes the above-described slip ratio control as braking force control when the ABS function operates for inhibiting the slip, which might occur at the wheel 3 when the braking device 7 operates according to the depression operation of the brake pedal 6 by the driver. In this case, the vehicle control device 1 controls the braking force generated at the wheel 3 by adjusting the brake pressure of the braking device 7 such that the actual slip ratio becomes the target slip ratio. The vehicle control device 1 decreases the brake pressure to decrease the braking force when the actual slip ratio becomes larger than the target slip ratio, and on the other hand, increases the brake pressure to increase the braking force when the actual slip ratio becomes smaller than the target slip ratio. The vehicle control device 1 can decrease a braking distance of the vehicle 2 while preventing brake lock and improve vehicle stability and steering by repeating them.

In the vehicle control device 1, when it is judged to start decreasing the brake pressure of the braking device 7 based on the slip ratio of the wheel 3 or a parameter substantially corresponding to the slip ratio, for example, in the slip ratio control as described above, judgment to start decreasing the pressure might vary depending on detection accuracy of the slip ratio, for example. It is possibly because, for example, the slip ratio of the wheel 3 itself used in the judgment is just an estimated value and the peak µ slip ratio at which a tire µ-S (friction coefficient-slip ratio) property of the wheel 3 and the friction coefficient of the tire are the maximum also varies according to road surface µ of the road on which this runs (for example, snowy road and the like) and a vehicle speed of the vehicle 2 and a load. For example, when the ABS function of the vehicle 2 operates, the load also changes by change in acceleration in accordance with deceleration of the vehicle 2, and according to this, the peak μ slip ratio and the like also varies. Since the tire μ-S property and the peak μ slip ratio vary by uncertain variation such as disturbance and design error in the slip ratio control in this manner, an operation range in which control accuracy is not stable might be present. According to this, for example, an existence range B of an actually realized slip ratio (indicated by a dotted line) might be enlarged relative to an existence range A of an intended slip ratio (illustrated by a solid line) in the slip ratio control as illustrated in FIGS. 2 and 3, and as a result, mean braking μ might be deteriorated.

Therefore, the vehicle control device 1 of this embodiment tries to improve the control accuracy when controlling the slip state of the wheel 3 by using a slip ratio speed of the wheel 3 or a parameter correlated with the slip ratio speed of the wheel 3 in start judgment of the slip ratio control. Meanwhile, the slip ratio control (braking force control) when the ABS function operates is described in following description. Also, a case in which the slip ratio speed of the wheel 3 is used in the start judgment of the slip ratio control is described in the description of this embodiment.

The vehicle control device 1 includes a processing unit 13, which performs a variety of processes, a storage unit 14 in which a computer program for controlling each unit of the vehicle 2 and the like is stored, a drive circuit not illustrated, which drives each unit of the vehicle 2, and an input/output unit 15 to which various sensors are connected and they are connected to one another so as to be able to send and receive signals. In the vehicle control device 1, the processing unit 13 is functionally-conceptually provided with a slip ratio detecting unit 13a, which obtains the slip ratio of the wheel 3 according to the running state of the vehicle 2, a slip ratio speed detecting unit 13b, which obtains the slip ratio speed of the wheel 3 according to the running state of the vehicle 2, and a braking/driving force control unit 13c, which controls the braking/driving force acting on the wheel 3 of the vehicle 2.

The slip ratio detecting unit 13a obtains the slip ratio of the wheel 3 by using a variety of well-known methods. The slip ratio detecting unit 13a obtains the slip ratio by using an equation (1) in following Equation 1 based on the wheel speed of each wheel 3 detected by the wheel speed sensor 12 and the vehicle speed of the vehicle 2 estimated from the wheel speed of each wheel 3, for example. In the equation (1), S, Vw, and Vr represent the slip ratio, the wheel speed, and the vehicle speed, respectively. Meanwhile, the slip ratio is calculated for each wheel 3 based on each detection value by each wheel speed sensor 12. Hereinafter, it is described supposing that calculation, the judgment, and the control regarding the slip ratio are performed for each wheel 3 unless otherwise noted.

$$S = \frac{Vr - Vw}{Vr} \quad (1)$$

The slip ratio speed detecting unit 13b obtains the slip ratio speed of the wheel 3 by using a variety of well-known methods. The slip ratio speed detecting unit 13b can obtain a slip ratio speed (in other words, change speed of slip ratio) dS/dt of the wheel 3 by calculating a temporal differential value of the slip ratio obtained by the slip ratio detecting unit 13a, for example. That is to say, the slip ratio speed detecting unit 13b herein obtains the slip ratio speed dS/dt from the slip ratio S calculated based on the wheel speed Vw of the wheel 3 and the vehicle speed Vr of the vehicle 2. In yet other words, the slip ratio speed dS/dt of this embodiment is eventually calculated based on the wheel speed Vw of the wheel 3 and the vehicle speed Vr of the vehicle 2.

The braking/driving force control unit 13c performs control to inhibit the slip of the wheel 3 by controlling the braking/driving force generated at the wheel 3 when the slip ratio of the wheel 3 of the vehicle 2 according to the running state of the vehicle 2 becomes larger than a slip ratio threshold value set in advance or when the slip ratio speed of the wheel 3 according to the running state of the vehicle 2 becomes larger than a slip ratio speed threshold value set in advance. Herein, the braking/driving force control unit 13c separately perform the slip ratio judgment, which is control start judgment using the slip ratio of the wheel 3, and the slip ratio speed judgment, which is the control start judgment using the slip ratio speed of the wheel 3. That is to say, control start judgment threshold values are separately set for the slip ratio of the wheel 3 and the slip ratio speed of the wheel 3, that is to say, the slip ratio threshold value and the slip ratio speed threshold value are set in advance for the slip ratio and the slip ratio speed of the wheel 3, respectively. The braking/driving force control unit 13c independently and separately judges the slip ratio of the wheel 3 and the slip ratio speed of the wheel 3 at the time of the control start judgment. According to this, the vehicle control device 1 can appropriately perform the control start judgment even when the peak μ slip ratio varies by difference in a manner of depressing the brake pedal 6 or when relationship between the slip ratio and the slip ratio speed changes according to change in a road surface condition such as a low-μ road and a high-μ road, for example.

Specifically, the braking/driving force control unit 13c compares the slip ratio S of the wheel 3 obtained by the slip ratio detecting unit 13a and a slip ratio threshold value S1 as the slip ratio judgment as illustrated in an S-μ (slip ratio-friction coefficient) diagram in FIG. 4, for example, and turns on the control to inhibit the slip of the wheel 3 by controlling the braking/driving force generated at the wheel 3 when the slip ratio S becomes larger than the slip ratio threshold value S1. The slip ratio threshold value S1 is the intended slip ratio set in advance according to the above-described peak μ slip ratio. The slip ratio threshold value S1 may have a predetermined range.

The braking/driving force control unit 13c controls the braking/driving force such that the slip ratio S falls within a predetermined range when the control to inhibit the slip of the wheel 3 by controlling the braking/driving force generated at the wheel 3 is turned on, for example. Herein, the braking/driving force control unit 13c controls the actuator 9 of the braking device 7, thereby decreasing the brake pressure to decrease the braking force when the slip ratio S becomes larger than the slip ratio threshold value S1 (intended slip ratio) and increases the brake pressure to increase the braking force when the slip ratio S becomes smaller than the slip ratio threshold value S1.

In addition to this, the braking/driving force control unit 13c compares the slip ratio speed dS/dt of the wheel 3 obtained by the slip ratio speed detecting unit 13b and a slip ratio speed threshold value DS as the slip ratio speed judgment as illustrated in an S-dS/dt (slip ratio-slip ratio speed) diagram in FIG. 5, for example, and turns on the control to inhibit the slip of the wheel 3 by controlling the braking/driving force generated at the wheel 3 when the slip ratio speed dS/dt becomes larger than the slip ratio speed threshold value DS. The slip ratio speed threshold value DS is an intended slip ratio speed set in advance according to the above-described peak μ slip ratio. The slip ratio speed threshold value DS may have a predetermined range. In this case, the braking/driving force control unit 13c performs the slip ratio speed judgment separately from the slip ratio judgment, so that this may start the control to inhibit the slip of the wheel 3 by controlling the braking/driving force generated at the wheel 3 when the slip ratio speed dS/dt becomes larger than the slip ratio speed threshold value DS even when the slip ratio S is a slip ratio S0 smaller than the slip ratio threshold value S1. Herein, the control in a case in which the control to inhibit the slip of the wheel 3 by controlling the braking/driving force generated at the wheel 3 is turned on is substantially similar to that described above.

The vehicle control device 1 configured as described above performs the control to inhibit the slip of the wheel 3 by controlling the braking/driving force generated at the wheel 3 when the slip ratio speed according to a degree of drop of the wheel speed of the wheel 3 corresponding to the slip, which might occur at the wheel 3 when the braking device 7 operates, becomes larger than the slip ratio speed threshold value, so that it is possible to judge a wheel state (slip state), which cannot be figured out only by the slip ratio and appropriately decrease the brake pressure to decrease the braking force according to this. As a result, the vehicle control device 1 can decrease the braking distance because the existence probability of the intended slip ratio increases and the mean braking μ and mean deceleration increase. Also, according to this, the vehicle control device 1 may appropriately respond to the indefinite variation such as the disturbance and the design error in the slip ratio control to control the slip state of the wheel 3 by controlling the braking/driving force, thereby improving a so-called robust property. Therefore, the vehicle control device 1 can appropriately perform the slip ratio control by control logic to take in the slip ratio speed in the slip ratio control of the wheel 3, thereby improving the control accuracy when controlling the slip state of the wheel 3. Also, the vehicle control device 1 can cumulatively use the slip ratio judgment using the slip ratio generally used and the slip ratio speed judgment using the slip ratio speed performed separately from the same together without interference, so that this may respond to various road surfaces and further improve the robust property, thereby further improving the control accuracy.

Next, an example of the control in the vehicle control device 1 is described with reference to the flowchart in FIG. 6. Meanwhile, this control routine is repeatedly executed at a control period of few ms to tens of ms.

First, the braking/driving force control unit 13c of the vehicle control device 1 judges whether the slip ratio S of the wheel 3 obtained by the slip ratio detecting unit 13a is larger than the slip ratio threshold value S1 set in advance as the slip ratio judgment (S100).

When the braking/driving force control unit 13c judges that the slip ratio S is not larger than the slip ratio threshold value S1 (S100: No), this judges whether the slip ratio speed dS/dt of the wheel 3 obtained by the slip ratio speed detecting unit 13b is larger than the slip ratio speed threshold value DS set in advance as the slip ratio speed judgment (S102).

When the braking/driving force control unit 13c judges that the slip ratio speed dS/dt is not larger than the slip ratio speed threshold value DS (S102: No), this finishes a current control period and shifts to a next control period.

When the braking/driving force control unit 13c judges that the slip ratio S is larger than the slip ratio threshold value S1 (S100: Yes), or when this judges that the slip ratio speed dS/dt is larger than the slip ratio speed threshold value DS (S102: Yes), this starts ABS control (slip ratio control), decreases the brake pressure to decrease the braking force generated at the wheel 3 (S104), finishes the current control period, and shifts to the next control period. In this case, the braking/driving force control unit 13c may set a decreased amount of the brake pressure, in other words, a decreased amount of the braking/driving force according to the acceleration and the vehicle speed of the vehicle 2, the slip ratio, the slip ratio speed and the like, for example. Meanwhile, in the control to increase the brake pressure, in other words, in the control to increase the braking/driving force, magnitude relationship between the slip ratio S and the slip ratio threshold value S1 and that between the slip ratio speed dS/dt and the slip ratio speed threshold value DS in the slip ratio judgment (S100) and the slip ratio speed judgment (S102) are inversed and the brake pressure is increased to increase the braking force generated at the wheel 3 at the S104.

FIG. 7 is an S-dS/dt (slip ratio-slip ratio speed) diagram explaining an example of the operation of the vehicle control device 1 configured as described above in which a plurality of (two) cases with different conditions such as the manner of depressing the brake pedal 6 and the road surface condition (road surface μ) are illustrated. As lines A and B in this drawing, the slip ratio speed differs when the condition such as the manner of depressing the brake pedal 6 and the road surface condition (road surface μ) is different even with the same slip ratio. In this case, since the vehicle control device 1 performs the slip ratio speed judgment separately from the slip ratio judgment as described above, this does not start the control to inhibit the slip of the wheel 3 until the slip ratio S reaches the slip ratio threshold value S1 in the condition of the line B, for example. On the other hand, the vehicle control device 1 may start the control to inhibit the slip of the wheel 3 by controlling the braking/driving force generated at the wheel 3 when the slip ratio speed dS/dt becomes larger than the slip ratio speed threshold value DS before the slip ratio S reaches the slip ratio threshold value S1 in the condition of the line A, and as a result, it is possible to surely inhibit overshoot of the slip ratio and the like.

According to the vehicle control device 1 according to the embodiment described above, when the slip ratio of the wheel 3 of the vehicle 2 according to the running state of the vehicle 2 becomes larger than the slip ratio threshold value set in advance, or when the slip ratio speed of the wheel 3 according to the running state of the vehicle 2 becomes larger than the slip ratio speed threshold value set in advance, this performs the control to inhibit the slip of the wheel 3 by controlling the braking/driving force generated at the wheel 3. Therefore, the vehicle control device 1 can decrease an effect of the operation such as the manner of depressing the brake pedal 6 by the driver and the road surface, for example, thereby improving the control accuracy when controlling the slip state of the wheel 3.

Meanwhile, although it is described that the slip ratio speed dS/dt is calculated by differentiating the slip ratio S with respect to time and is eventually calculated based on the wheel speed Vw of the wheel 3 and the vehicle speed Vr of the vehicle 2 in the description above, there is no limitation. The slip ratio speed dS/dt may also be calculated by calculating an amount of change of the slip ratio S per unit time. Also, the slip ratio speed dS/dt may be approximately calculated based on wheel acceleration of the wheel 3 and the vehicle speed of the vehicle 2 as described hereinafter. That is to say, the slip ratio speed detecting unit 13b may approximately calculate the slip ratio speed dS/dt based on the wheel acceleration of the wheel 3 and the vehicle speed of the vehicle 2 irrespective of the slip ratio S.

Specifically, the above-described equation (1) may be transformed into an equation (2) in following Equation 2.

$$S = \frac{Vr - Vw}{Vr} = 1 - \frac{Vw}{Vr} \quad (2)$$

Therefore, the slip ratio speed dS/dt may be represented by an equation (3) in following Equation 3.

[Equation 3]

$$\frac{dS}{dt} = \frac{d}{dt}\left(1 - \frac{Vw}{Vr}\right) = -\frac{d}{dt}\left(\frac{Vw}{Vr}\right) = -\left\{Vw \cdot \frac{d}{dt}\left(\frac{1}{Vr}\right) + \frac{1}{Vr} \cdot \frac{dVw}{dt}\right\} \quad (3)$$

Herein, when the vehicle speed Vr is approximated as Vr=Vo−α·t, the equation (3) may be transformed into an equation (4) in following Equation 4. In the equation (4), Vo represents an initial speed at the time of braking of the vehicle 2, α represents the mean deceleration at the time of the braking of the vehicle 2, and t represents elapsed time from start of the deceleration.

$$\frac{dS}{dt} \approx -\left\{Vw \cdot \frac{d}{dt}\left(\frac{1}{V_0 - \alpha t}\right) + \frac{1}{V_0 - \alpha t} \cdot \frac{dVw}{dt}\right\} \quad (4)$$

$$= -\left\{Vw \cdot \frac{\alpha}{(V_0 - \alpha t)^2} + \frac{1}{V_0 - \alpha t} \cdot \frac{dVw}{dt}\right\}$$

Herein, by approximating the wheel speed Vw as Vw=0.9 Vr based on the vehicle speed Vr while supposing that the intended slip ratio falls within a range of 5 to 15%, the equation (4) can be transformed into an equation (5) in following Equation 5. In the equation (5), dVW represents the wheel acceleration of the wheel 3.

$$\frac{dS}{dt} \approx -\left\{0.9Vr \cdot \frac{\alpha}{(V_0 - \alpha t)^2} + \frac{1}{V_0 - \alpha t} \cdot \frac{dVw}{dt}\right\} \quad (5)$$

$$= -\frac{0.9\alpha + dVW}{Vr} \left(\because dVW = \frac{dVw}{dt}\right)$$

Therefore, the slip ratio speed detecting unit 13b can approximately calculate the slip ratio speed dS/dt by simple calculation by substituting three parameters, which are the wheel acceleration dVW of the wheel 3, the vehicle speed Vr of the vehicle 2, and the mean deceleration a into the equation (5). In this case, the wheel acceleration dVW of the wheel 3 and the vehicle speed Vr of the vehicle 2 may be calculated based on the detection value by each wheel speed sensor 12, for example. Also, the mean deceleration a may be set in advance according to a result of a test and the like, for example. As a result, the slip ratio speed detecting unit 13b may approximately calculate the slip ratio speed dS/dt based on the wheel acceleration dVW of the wheel 3 and the vehicle speed Vr of the vehicle 2. In this case also, the vehicle control device 1 can improve the control accuracy when controlling the slip state of the wheel 3 by decreasing the effect of the operation such as the manner of depressing the brake pedal 6 by the driver and the road surface, for example.

Second Embodiment

Figure 8:
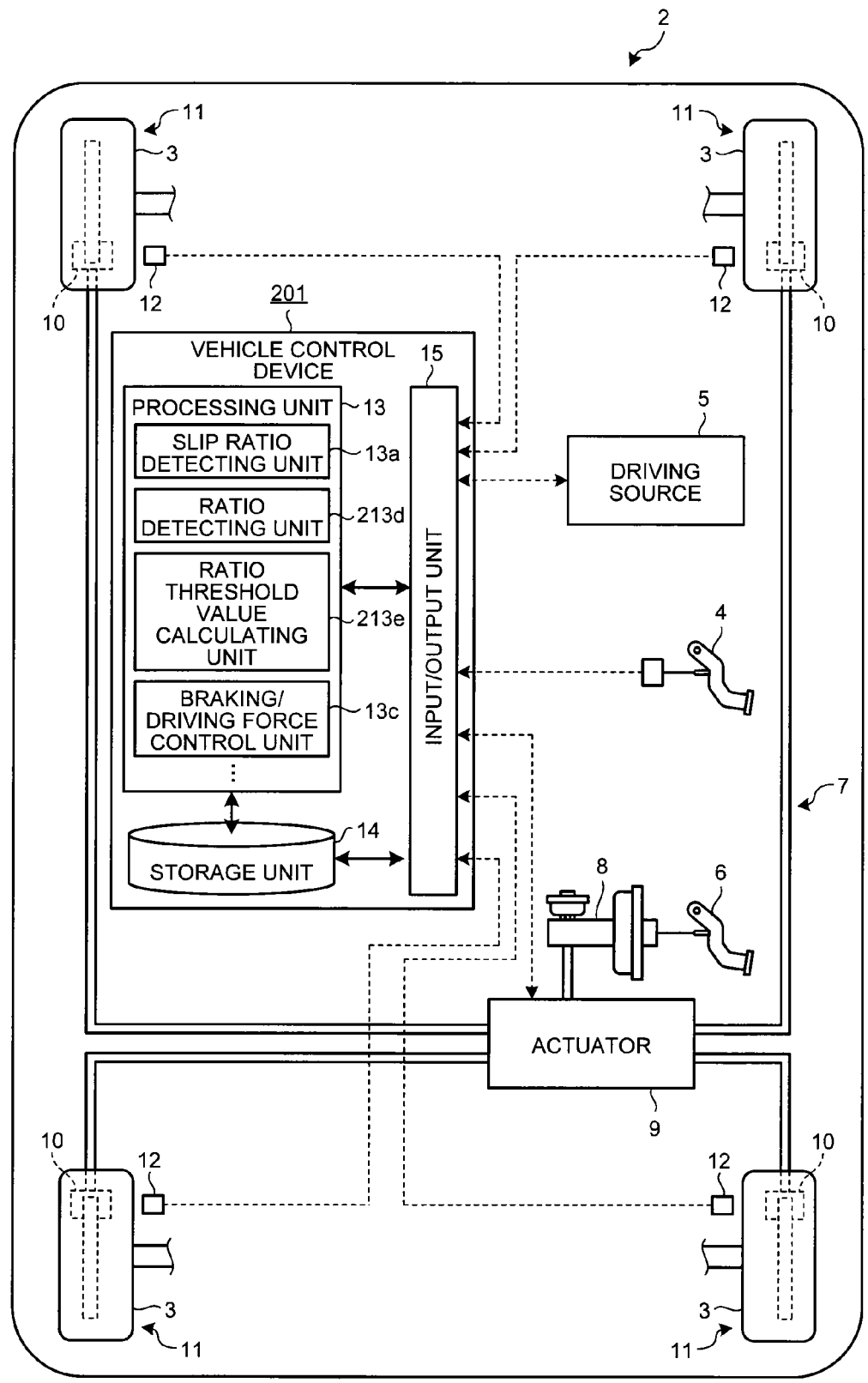
FIG. 8 is a schematic configuration diagram of a vehicle control device according to a second embodiment.
Figure 9:
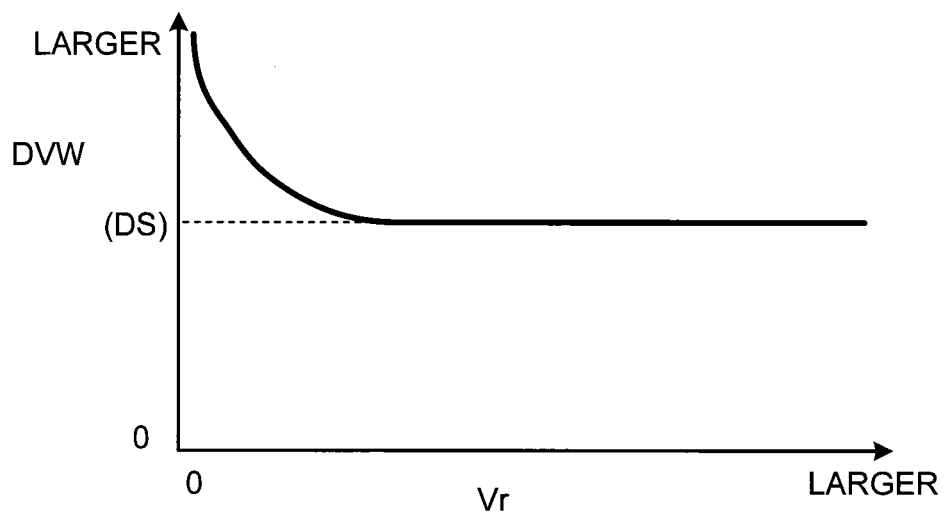
FIG. 9 is a diagram explaining a ratio threshold value of the vehicle control device according to the second embodiment.
Figure 10:
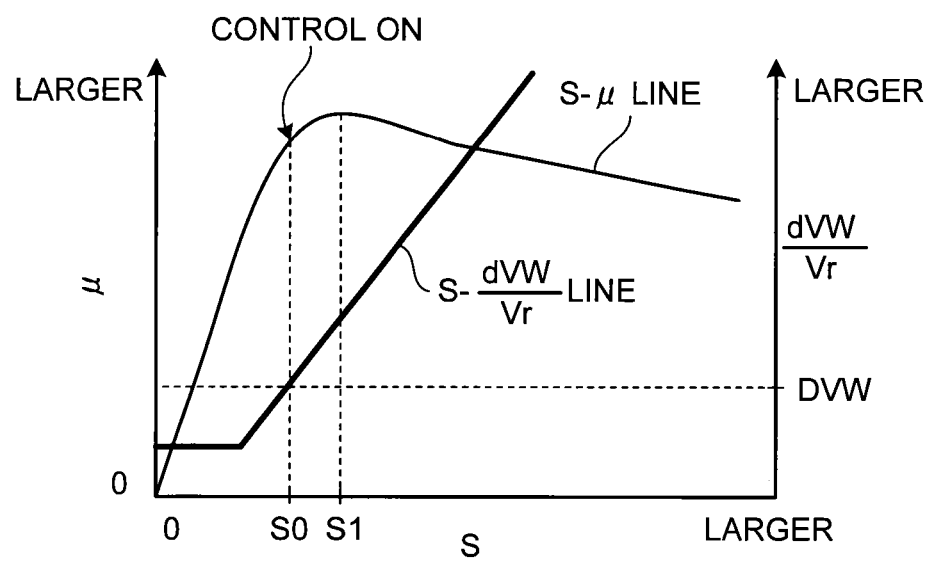
FIG. 10 is a diagram illustrating ratio judgment of the vehicle control device according to the second embodiment.
Figure 11:
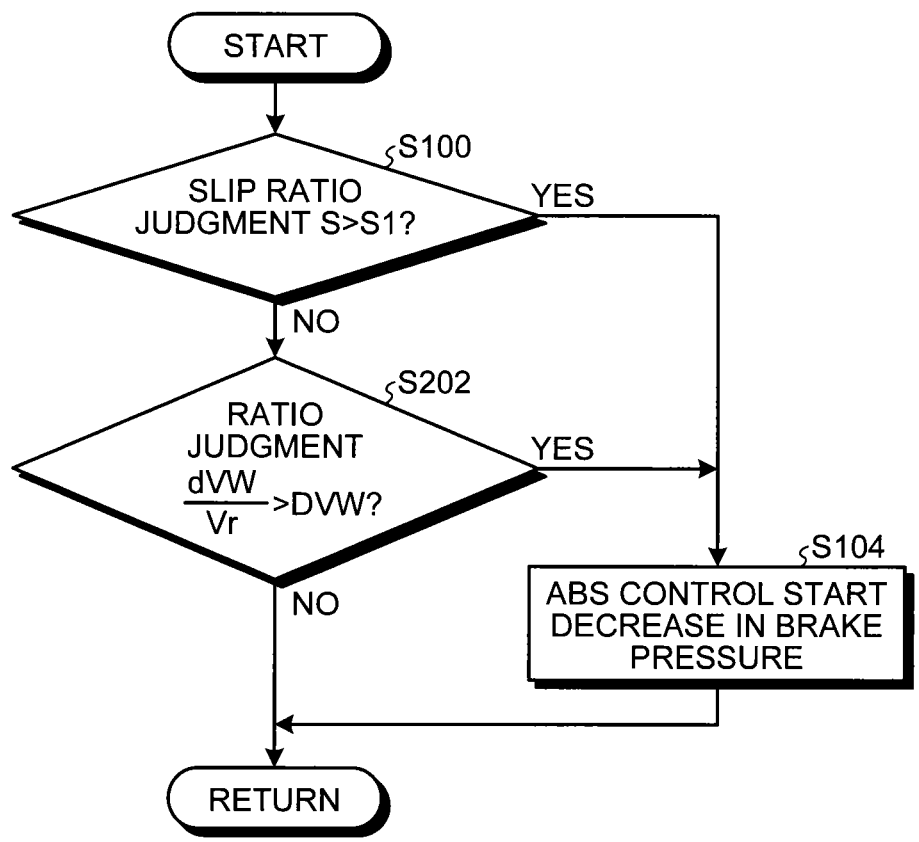
FIG. 11 is a flowchart explaining an example of control of the vehicle control device according to the second embodiment.

FIG. 8 is a schematic configuration diagram of a vehicle control device according to a second embodiment, FIG. 9 is a diagram explaining a ratio threshold value of the vehicle control device according to the second embodiment, FIG. 10 is a diagram illustrating ratio judgment of the vehicle control device according to the second embodiment, and FIG. 11 is a flowchart explaining an example of control of the vehicle control device according to the second embodiment. The vehicle control device according to the second embodiment is different from the vehicle control device according to the first embodiment in that this performs the ratio judgment in place of slip ratio speed judgment. In addition to this, description of a configuration, an action, and an effect common to those of the above-described embodiment are not overlapped as much as possible and same reference signs are given thereto.

A vehicle control device 201 of this embodiment illustrated in FIG. 8 tries to improve control accuracy when controlling a slip state of a wheel 3 by using not a slip ratio speed of the wheel 3 itself but a parameter correlated with the slip ratio speed in start judgment of slip ratio control. The vehicle control device 201 performs control to inhibit a slip of the wheel 3 by controlling braking/driving force generated at the wheel 3 when a ratio between wheel acceleration of the wheel 3 of the vehicle 2 and a vehicle speed of the vehicle 2 calculated according to a running state of the vehicle 2 becomes larger than the ratio threshold value. Herein, the ratio between the wheel acceleration and the vehicle speed is the parameter correlated with the slip ratio speed of the wheel 3 and the ratio threshold value is a control start judgment threshold value set for the ratio between the wheel acceleration and the vehicle speed and is changed according to the vehicle speed of the vehicle 2 as described later.

Specifically, in the vehicle control device 201, a processing unit 13 is functionally-conceptually provided with a ratio detecting unit 213d and a ratio threshold value calculating unit 213e in place of a slip ratio speed detecting unit 13b (refer to FIG. 1).

The ratio detecting unit 213d obtains the ratio between the wheel acceleration of the wheel 3 and the vehicle speed of the vehicle 2 according to the running state of the vehicle 2. The ratio detecting unit 213d may calculate wheel acceleration dVW of the wheel 3 and a vehicle speed Vr of the vehicle 2 based on a detection value by each wheel speed sensor 12 and calculate a ratio dVW/Vr between the wheel acceleration and the vehicle speed, for example. The ratio threshold value calculating unit 213e obtains a ratio threshold value DVW according to the running state of the vehicle 2.

Herein, the above-described equation (5) can be transformed into an equation (6) in following Equation 6.

$$\frac{dS}{dt} \approx -\frac{0.9\alpha + dVW}{Vr} \Leftrightarrow \frac{dS}{dt} + \frac{0.9\alpha}{Vr} \approx -\frac{dVW}{Vr} \quad (6)$$

Then, the ratio threshold value DVW is set as a function related to the vehicle speed Vr as an equation (7) in following Equation 7. The ratio threshold value calculating unit 213e can obtain the ratio threshold value DVW by substituting the vehicle speed Vr of the vehicle 2 into the equation (7).

$$DS + \frac{0.9\alpha}{Vr} = DVW \quad (7)$$

In this case, when the vehicle speed Vr increases, DS>>0.9 α/Vr is satisfied and DVW≈□DS is satisfied, so that the ratio threshold value DVW becomes the threshold value, which changes according to the vehicle speed Vr as in a Vr-DVW (vehicle speed-ratio threshold value) diagram in FIG. 9.

A braking/driving force control unit $13c$ performs the control to inhibit the slip of the wheel 3 by controlling the braking/driving force generated at the wheel 3 when a slip ratio of the wheel 3 of the vehicle 2 calculated according to the running state of the vehicle 2 becomes larger than a slip ratio threshold value set in advance or when the ratio between the wheel acceleration and the vehicle speed calculated according to the running state of the vehicle 2 becomes larger than the ratio threshold value, which varies according to the vehicle speed.

The braking/driving force control unit $13c$ compares the ratio dVW/Vr between the wheel acceleration and the vehicle speed obtained by the ratio detecting unit $213d$ and the ratio threshold value DVW obtained by the ratio threshold value calculating unit $213e$ as the ratio judgment as illustrated in an S-dVW/Vr (slip ratio-ratio between wheel acceleration and vehicle speed) diagram in FIG. 10, for example, and turns on the control to inhibit the slip of the wheel 3 by controlling the braking/driving force generated at the wheel 3 when the ratio dVW/Vr becomes larger than the ratio threshold value DVW. In this case, the braking/driving force control unit $13c$ performs the ratio judgment separately from the slip ratio judgment, so that this can start the control to inhibit the slip of the wheel 3 by controlling the braking/driving force generated at the wheel 3 when the ratio dVW/Vr becomes larger than the ratio threshold value DVW even when a slip ratio S is a slip ratio S0 smaller than a slip ratio threshold value S1. Meanwhile, the slip ratio judgment is equivalent to that described above, so that the description thereof is omitted. Also, the S-dVW/Vr line illustrated in FIG. 10 is substantially the same as the S-dS/dt line in FIG. 5.

Next, an example of the control of the vehicle control device 201 is described with reference to the flowchart in FIG. 11.

When the braking/driving force control unit $13c$ judges that the slip ratio S is not larger than the slip ratio threshold value S1 (S100: No), this judges whether the ratio dVW/Vr between the wheel acceleration and the vehicle speed obtained by the ratio detecting unit $213d$ is larger than the ratio threshold value DVW obtained by the ratio threshold value calculating unit $213e$ as the ratio judgment (S202).

When the braking/driving force control unit $13c$ judges that the ratio dVW/Vr between the wheel acceleration and the vehicle speed is not larger than the ratio threshold value DVW (S202: No), this finishes a current control period and shifts to a next control period. When the braking/driving force control unit $13c$ judges that the slip ratio S is larger than the slip ratio threshold value S1 (S100: Yes) or when this judges that the ratio dVW/Vr between the wheel acceleration and the vehicle speed is larger than the ratio threshold value DVW (S202: Yes), this starts ABS control (slip ratio control) and decreases a brake pressure to decrease the braking force generated at the wheel 3 (S104), and finishes the current control period to shift to the next control period.

The vehicle control device 201 configured as described above performs the control to inhibit the slip of the wheel 3 by controlling the braking/driving force generated at the wheel 3 when the ratio between the wheel acceleration and the vehicle speed correlated with the slip ratio speed becomes larger than the ratio threshold value, so that this can judge a wheel state (slip state), which cannot be figured out only by the slip ratio, and appropriately decrease the brake pressure to decrease the braking force according to this. As a result, the vehicle control device 201 can decrease a braking distance and improve a robust property.

The vehicle control device 201 according to the above-described embodiment performs the control to inhibit the slip of the wheel 3 by controlling the braking/driving force generated at the wheel 3 when the ratio between the wheel acceleration of the wheel 3 of the vehicle 2 and the vehicle speed of the vehicle 2 according to the running state of the vehicle 2 becomes larger than the ratio threshold value. Therefore, the vehicle control device 201 is capable of improving the control accuracy when controlling the slip state of the wheel 3 by decreasing an effect of operation such as a manner of depressing a brake pedal 6 by a driver and a road surface, for example, and judging control start by simple calculation based on combination of the wheel acceleration of the wheel 3 and the vehicle speed of the vehicle 2.

Meanwhile, the vehicle control device according to the above-described embodiment of the present invention is not limited to the above-described embodiment and can be variously modified within the scope of claims.

For example, although it is described that the vehicle control device 201 described above separately performs the slip ratio judgment, which is control start judgment using the slip ratio of the wheel 3, and the ratio judgment, which is the control start judgment using the ratio between the wheel acceleration of the wheel 3 and the vehicle speed of the vehicle 2, this may also be configured not to perform the slip ratio judgment.

Also, although it is described that a braking device 7 is a hydraulic braking device, which performs pressure braking using a hydraulic pressure, in the description above, this is not limited thereto. Any braking device 7 may be used as long as this may allow the braking force to act at the wheel 3, and this may be, for example, the device, which generates the braking force at the wheel 3 by so-called regenerative braking by an electric motor, which may operate as a power generator, and the like, for example.

Also, although the slip ratio control is described as braking force control of the vehicle control device 1 when an ABS function operates for inhibiting the slip, which might occur at the wheel 3 when the braking device 7 operates according to depression operation of the brake pedal 6 by the driver, in the description above, this is not limited to the braking force control and may also be applied to the slip ratio control as driving force control. That is to say, the vehicle control device 1 is capable of executing the above-described slip ratio control as the driving force control when a TRC function operates for inhibiting the slip, which might occur by spin-out of the wheel 3 when an output of a driving source 5 increases according to depression operation of an accelerator pedal 4 by the driver.

INDUSTRIAL APPLICABILITY

As described above, the vehicle control device according to the present invention is preferably applied to a variety of vehicle control devices, which control the slip state of the wheel of the vehicle.

REFERENCE SIGNS LIST 1, 201 VEHICLE CONTROL DEVICE
2 VEHICLE
3 WHEEL
4 ACCELERATOR PEDAL
5 DRIVING SOURCE
6 BRAKE PEDAL
7 BRAKING DEVICE
8 MASTER CYLINDER

9 ACTUATOR
10 WHEEL CYLINDER
11 HYDRAULIC BRAKING UNIT
12 WHEEL SPEED SENSOR
13a SLIP RATIO DETECTING UNIT
13b SLIP RATIO SPEED DETECTING UNIT
13c BRAKING/DRIVING FORCE CONTROL UNIT
213d RATIO DETECTING UNIT
213e RATIO THRESHOLD VALUE CALCULATING UNIT

The invention claimed is:

1. A vehicle control device comprising:
  a ratio detector configured to obtain a ratio between wheel acceleration of a wheel and vehicle speed of a vehicle calculated according to a running state of the vehicle;
  a ratio threshold value calculator configured to obtain a ratio threshold value that is a control start judgment threshold value set for the ratio between the wheel acceleration and the vehicle speed and is changed according to the vehicle speed of the vehicle; and
  a braking/driving force controller configured to control braking/driving force generated at the wheel,
  wherein when the ratio between the wheel acceleration and the vehicle speed obtained by the ratio detector becomes larger than the ratio threshold value obtained by the ratio threshold value calculator, the vehicle control device performs control to inhibit a slip of the wheel by controlling braking/driving force generated at the wheel.

2. The vehicle control device according to claim 1, further comprising:
  a slip ratio detector configured to obtain a slip ratio of the wheel based on a wheel speed of the wheel and the vehicle speed estimated from the wheel speed, wherein
  when the slip ratio of the wheel obtained by the slip ratio detector according to the running state of the vehicle becomes larger than a slip ratio threshold value set in advance, the vehicle control device performs the control to inhibit the slip of the wheel by controlling the braking/driving force generated at the wheel.

3. The vehicle control device according to claim 2, wherein the ratio is a parameter correlated with a slip ratio speed of the wheel.

4. The vehicle control device according to claim 1, wherein the ratio is a parameter correlated with a slip ratio speed of the wheel.

* * * * *